US 7,917,651 B2

(12) United States Patent
Khan et al.

(10) Patent No.: US 7,917,651 B2
(45) Date of Patent: Mar. 29, 2011

(54) APPARATUS, SYSTEM, AND METHOD FOR ASYNCHRONOUS COMPLEX INBOUND TRANSACTIONS FROM SAP APPLICATIONS USING SERVICE ORIENTED ARCHITECTURE

(75) Inventors: Zafrulla Khan, Fremont, CA (US); Peter Bow Kwong Lee, Foster City, CA (US); Alan Michael Wintroub, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 11/420,692

(22) Filed: May 26, 2006

(65) Prior Publication Data
US 2007/0288934 A1    Dec. 13, 2007

(51) Int. Cl.
*G06F 15/16* (2006.01)
(52) U.S. Cl. ......... 709/246; 709/201; 715/239; 715/249
(58) Field of Classification Search .................. 709/201, 709/246; 715/200, 201, 234, 239, 249
See application file for complete search history.

(56) References Cited

U.S. PATENT DOCUMENTS

| | | | |
|---|---|---|---|
| 6,466,934 B2 | 10/2002 | Seese et al. | 707/4 |
| 6,496,861 B1 | 12/2002 | Sevcik | 709/224 |
| 6,513,044 B2 | 1/2003 | Seese et al. | 707/104 |
| 6,523,027 B1 | 2/2003 | Underwood | 707/3 |
| 6,609,128 B1 | 8/2003 | Underwood | 707/10 |
| 7,509,649 B2 * | 3/2009 | Shenfield | 719/310 |
| 7,680,828 B2 * | 3/2010 | Gorelik | 707/763 |
| 2007/0250600 A1 * | 10/2007 | Freese et al. | 709/219 |

OTHER PUBLICATIONS

Edward E. Cobb "The impact of object technology on commercial transaction processing" VLDB Journal (1997) 6: 173-190.
Andrew A. Hanish et al. "Communication protocol design to facilitate re-use based on the object-oriented paradigm" Mobile Networks and Applications (1997) 2: 285-301.
Mikhail Genkin "Understanding JCA Transactions" Oct. 19, 2004 http://www-128.ibm.com/developerworks/java/library/j-jca.
Brahim Medjahed et al. "Business-to-business interactions: issues and enabling technologies" VLDB Journal (2003) 12: 59-85.
"Message and Transactional Inflow", eDocs>BEA Weblogic Server 9.0 Documentation>Programming WebLogic Resource Adapters > Message and Transactional Inflow.

* cited by examiner

*Primary Examiner* — William C Vaughn, Jr.
*Assistant Examiner* — Mohamed Ibrahim
(74) *Attorney, Agent, or Firm* — Kunzler Needham Massey & Thorpe

(57) ABSTRACT

An apparatus, system, and method are disclosed for managing inbound transactions from an SAP application. A transaction ID module is included that receives a transaction identifier ("TID") associated with an event from an SAP application by way of an ALE interface for an asynchronous transaction. A recording module is included to record an event record in an event tracking repository by way of an XA transaction, the event record comprising the TID and an associated transaction status. An intermediate document module is included to receive an intermediate document ("IDoc") containing transaction data from a transaction associated with the event and the associated TID from the SAP application by way of the ALE interface using a Transaction Remote Function Call protocol. A conversion module is included to convert the IDoc to a service data object ("SDO") and an SDO transmit module is included to transmit the SDO to an endpoint using the XA transaction.

22 Claims, 7 Drawing Sheets

APPARATUS, SYSTEM, AND METHOD FOR ASYNCHRONOUS COMPLEX INBOUND TRANSACTIONS FROM SAP APPLICATIONS USING SERVICE ORIENTED ARCHITECTURE

BACKGROUND OF THE INVENTION

1. Field of the Invention

This invention relates to asynchronous inbound transactions and more particularly relates to asynchronous inbound transactions from an SAP application using a service oriented architecture.

2. Description of the Related Art

Communication over the Internet and similar computer networks where components and communication pathways have a tendency to change more easily lends itself to loosely coupled connections using service oriented architecture ("SOA"). Loose coupling describes a relationship between two or more computer systems exchanging data where each end of a communication or transaction makes its requirements explicit and makes few assumptions about the other end. Loose coupling lends itself to replaceable components within or at either end of a communication pathway.

SOA is a perspective of software architecture where services are used to support the requirements of software users. Nodes in an SOA environment make resources available to other participants in the network as independent services that a participant may use in a standardized way. Services interoperate based on a formal definition, or contact, which is independent from the underlying platform and programming language. Software components are reusable and replaceable because the interface is standards-compliant and independent of the underlying implementation of the service. SOA can support integration with a complex enterprise information system ("EIS").

An EIS is a complex computing system that supports a high quality of service, usually dealing with large volumes of data, and is capable of supporting a large organization, such as a banking system or a large retail chain. Examples of enterprise information systems are Oracle®, PeopleSoft®, and SAP®. SAP is a program used for managing business information, customer relations, supply chains, human resources, and product lifecycles, among other services. SAP and other enterprise information systems may exchange information with other enterprise information systems. Integration brokers facilitate information exchange. An example of an integration broker is the WebSphere® Process Server ("WPS"). An integration broker includes an adapter to interface with an enterprise information system, such as SAP, with another enterprise information system or for a client application.

An important form of communication between enterprise information systems is that of a transaction. A transaction involves a related collection of operations. A transaction has the properties of atomicity, consistency, isolation, and durability. Atomicity means that all of the operations are applied or none of them are applied. For example, in a financial transaction, a credit to one account and debit to another account must both be applied or neither applied. Consistency means that the transaction represents a correct transformation of the application state. For example, in a financing, the sum of all asset accounts must equal the sum of all liabilities. Isolation means that the effects of one transaction do not affect other transactions executing concurrently. Durability means that once a transaction successfully completes, changes to the application will survive failures. This is usually accomplished through backing up data and error recovery.

Typically a transaction involving two or more resource applications requires a verification process called a two-phase commit. A two-phase commit involves a first step of sending the required data and accompanying instructions to each resource application for execution. Each resource application executes the required part of the transaction and logs the transaction. Each resource application then typically replies to a resource manager with an agreement message if the transaction succeeded or an abort message. In an asynchronous environment, the agreement message may simply be an acknowledgement that the resource application has successfully received the data for execution. If all the resource applications return a success message, then the resource manager can send a commit message and the resource applications release all locks on the transaction, finalize the changes, and send an acknowledgment to the resource manager. In case of failure of any part of the operation, the resource manager signals a rollback and all operations are undone and the affected accounts are restored to the state prior to the operation.

Where only one resource application is part of a transaction, a similar procedure may be used to ensure once only delivery of the transaction. Such a transaction may be called a local transaction. A local transaction does not involve a two-phase commit, but may include a commit step after execution of the transaction in the resource application. For one or more resource applications, the resource applications may be running on various enterprise information systems loosely coupled through an integration broker and complying with the SOA.

One method for communicating with an SAP application is to use a form of the remote function call ("RFC") protocol. Transactional RFC ("tRFC") protocol is used for asynchronous transactions. SAP applications may use the application link enabling ("ALE") interface for processing asynchronous transactions. Transactions may be inbound or outbound. Inbound transactions with an SAP application are from the perspective of an adapter in communication with the SAP application and cover transactions pushed to the adapter from the SAP application. Adapters available in the present state of the art for handling inbound asynchronous transactions from an SAP application in a Service Component Architecture ("SCA") do not support J2EE Connector Architecture ("JCA" or "J2C") calls using Service Data Objects ("SDO") by way of extended architecture ("XA") transactions to achieve guaranteed once only delivery or two-phase commit. Adapters in the current state of the art handling inbound asynchronous transactions from SAP applications also do not support multiple SAP applications.

From the foregoing discussion, it should be apparent that a need exists for an apparatus, system, and method that handle inbound asynchronous transactions using the tRFC protocol from one or more SAP applications and allowing J2C inbound communication to one or more endpoints using XA transactions. Beneficially, such an apparatus, system, and method would provide an event recovery mechanism, provide for guaranteed once only delivery, and convert an intermediate document ("IDoc") or IDoc packet from an SAP application into one or more service data objects ("SDO") that include one or more business objects ("BO") for delivery to one or more endpoints.

SUMMARY OF THE INVENTION

The present invention has been developed in response to the present state of the art, and in particular, in response to the problems and needs in the art that have not yet been fully solved by currently available inbound transaction managers. Accordingly, the present invention has been developed to provide an apparatus, system, and method for managing inbound transactions from an SAP application that overcome many or all of the above-discussed shortcomings in the art.

A method of the present invention is presented for managing inbound transactions for an SAP application. The method in the disclosed embodiments substantially includes the steps necessary to carry out the functions presented above with respect to the operation of the described apparatus and system. In one embodiment, the method includes receiving a transaction identifier ("TID") associated with an event from an SAP application for an asynchronous transaction. The method includes recording an event record in an event tracking repository by way of an XA transaction, the event record comprising the TID and an associated transaction status. The method includes receiving an IDoc containing transaction data from a transaction associated with the event and the associated TID from the SAP application using a tRFC protocol. The method includes converting the IDoc to an SDO, and transmitting the SDO to an endpoint by way of the XA transaction.

The method also may include transmitting a commit call to the endpoint by way of the XA transaction in response to receiving a commit call from the SAP application. In another embodiment, the method includes comprising deleting the event record associated with the TID from the event tracking repository in response to receiving a confirm call from the SAP application. The method, in another embodiment, includes updating the associated transactions status to indicate execution of the transaction associated with the TID in response to receiving a commit call from the SAP application and successfully delivering the SDO to the endpoint. In yet another embodiment, successful delivery of the SDO further comprises verifying that the SDO is committed at the endpoint by way of tracking delivery using an extended architecture identifier ("XID") associated with the SDO.

In a further embodiment, the method includes rolling back the transaction associated with the TID at each endpoint that received the SDO and updating the event record associated with the TID to a rollback status in response to an error in delivering or processing the SDO at an endpoint. The method may also include replicating the SDO and transmitting the SDO to a plurality of endpoints, where the plurality of endpoints has identical subscription information. In another embodiment, the method includes returning a executed status to the SAP application in response to receiving a TID matching a TID in the event tracking repository having an associated transaction status indicating completion of the transaction and returning a created status to the SAP application in response to any of receiving a TID matching a TID in the event tracking repository having an associated transaction status of a rollback status and receiving a TID not matching a TID in the event tracking repository. In yet another embodiment, the IDoc comprises an IDoc packet with multiple IDocs and the method includes splitting the IDoc packet into a plurality of IDocs in response to an IDoc split indicator, converting each resulting IDoc into an SDO, and transmitting each resulting SDO to one or more endpoints based on subscription information of the endpoints.

In one embodiment, the IDoc is an IDoc packet comprising multiple IDocs and the method includes converting the IDoc packet to an SDO and transmitting the SDO to the endpoint. In another embodiment, the method includes associating an XID with the SDO for once only delivery of the SDO to the endpoint. In another embodiment, the method includes creating an event listener associated with an endpoint in response to the endpoint registering with the adapter, wherein the event listener is configured to listen for events pushed from the SAP application and intended for delivery to the endpoint. In yet another embodiment, the IDoc includes a cross-reference identifier in metadata of the IDoc. The cross-reference identifier comprises a mapping to a key identifier located in the IDoc and the key identifier comprises information used by the endpoint in completing the transaction. The method may also include receiving TIDs and IDocs from more than one SAP application wherein each SAP application supports transactions with a unique set of one or more endpoints. In another embodiment, the method further comprises parsing the SDO in response to a parsing indicator.

The apparatus for managing inbound transactions from an SAP application is provided with a plurality of modules configured to functionally execute the necessary steps of receiving an IDoc from an SAP application, converting the IDoc to an SDO, and assuring once only delivery of the SDO to an endpoint using an XA transaction. These modules in the described embodiments include a TID push module that pushes a TID associated with an event through an ALE interface to an adapter with a listener thread. The listener thread is configured to listen for events from the SAP application to be transmitted to an endpoint registered with the adapter. The adapter is configured to record an event record in an event tracking repository by way of an XA transaction. The event record comprises the TID and an associated transaction status.

An IDoc push module is included to push an IDoc containing transaction data from a transaction associated with the event and the associated TID to the adapter by way of the ALE interface using a tRFC protocol. The adapter is configured to convert the IDoc to an SDO and to transmit the SDO to the endpoint by way of the XA transaction in response to receiving the IDoc from the SAP application. An SAP commit module is included to transmit a commit call with the associated TED to the adapter. The adapter is configured to transmit the commit call to the endpoint using an XA transaction in response to receiving the commit call from the SAP application. An SAP confirm module is included that transmits a confirm call with the associated TID to the adapter. The adapter is configured to delete the event record associated with the TID from the event tracking repository in response to receiving the confirm call from the SAP application.

The apparatus, in one embodiment, is configured to include an SAP rollback module that transmits a rollback call and associated TID to the adapter. The adapter is configured to rollback the transaction associated with the TID in response to receiving the rollback call from the SAP application. In another embodiment, a status module is included to update the status of an event in the SAP application in response to receiving a status update call from the adapter.

A system of the present invention is also presented for managing inbound transactions from an SAP application in a service oriented architecture ("SOA"). The system may be embodied by an SAP application with an SAP interface, two or more endpoints, and an adapter on an integration broker in communication with the endpoint, the adapter loosely coupled to the SAP interface of the SAP application and the endpoints. In particular, the adapter, in one embodiment, includes a transaction ID module that receives a TID associated with an event from an SAP application by way of the SAP interface for an asynchronous transaction. The adapter includes a recording module that records an event record in an event tracking repository by way of an XA transaction, the event record comprising the TID and an associated transaction status. The adapter includes an intermediate document module that receives an IDoc containing transaction data from a transaction associated with the event and the associated TID from the SAP application by way of the SAP interface using a tRFC protocol. The adapter includes a conversion module that converts the IDoc to a SDO, and an SDO transmit module that transmits the SDO to at least one of the endpoints by way of the XA transaction.

The endpoints, in one embodiment, comprise Service Component Architecture ("SCA") components. In another embodiment, the system includes a commit module that transmits a commit call associated with the TID to the endpoints receiving the SDO by way of an XA transaction in response to receiving a commit call with an associated TID from the SAP application. In yet another embodiment, the system includes a confirm module that deletes the event record associated with the TID from the event tracking repository in response to receiving a confirm call from the SAP application with the associated TID.

Another method of the present invention is presented for managing inbound transactions for an SAP application. The method in the disclosed embodiments substantially includes the steps necessary to carry out the functions presented above with respect to the operation of the described apparatus and system. In one embodiment, the method includes determining customer integration broker connection requirements and executing an adapter for managing inbound transactions from an SAP application. The adapter is configured to receive a TID associated with an event from an SAP application for an asynchronous transaction and record an event record in an event tracking repository by way of an XA transaction, the event record comprising the TID and an associated transaction status. The adapter is also configured to receive an IDoc containing transaction data from a transaction associated with the event and the associated TID from the SAP application using a tRFC protocol, to convert the IDoc to a SDO, and to transmit the SDO to an endpoint by way of the XA transaction.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
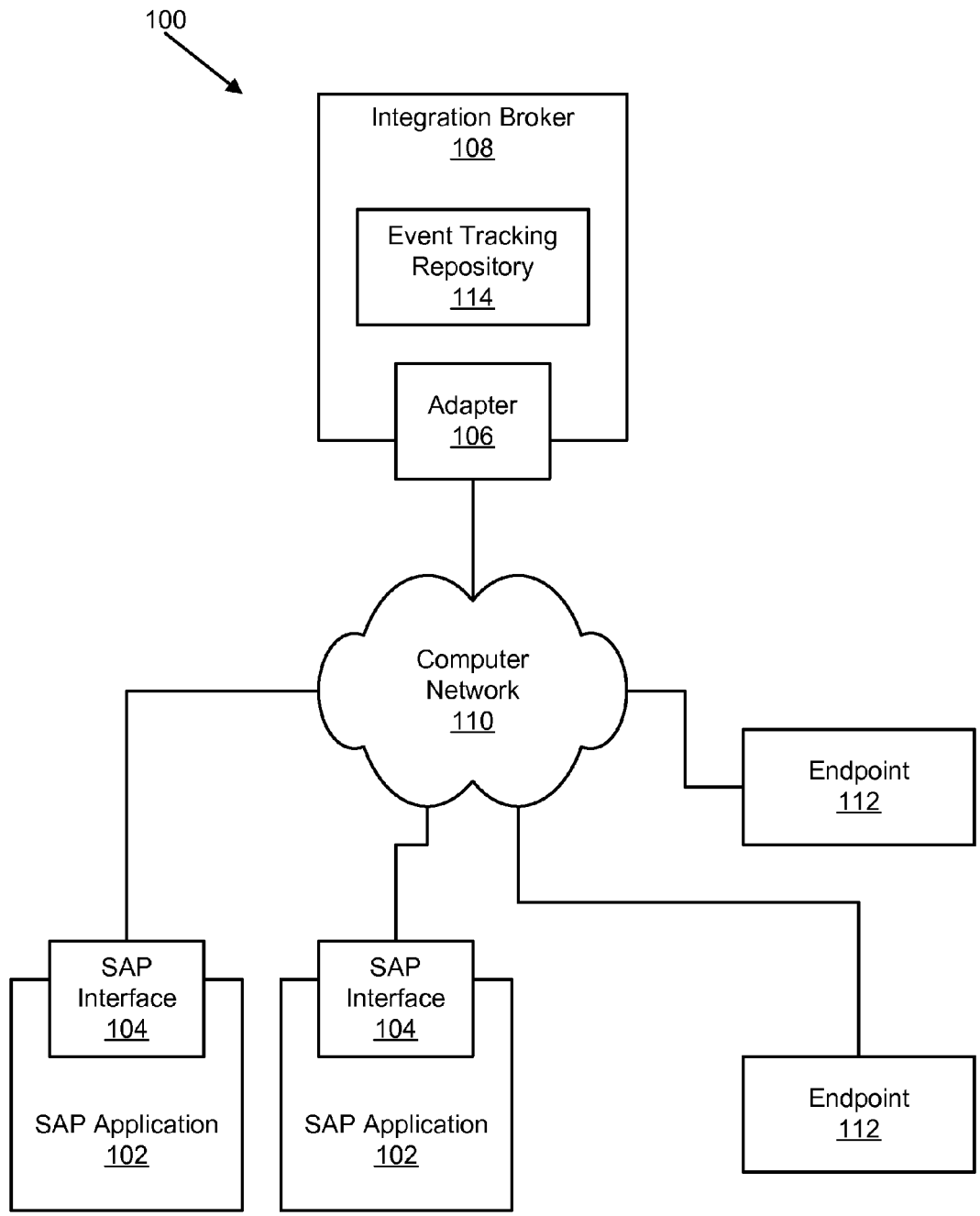
FIG. 1 is a schematic block diagram illustrating one embodiment of a system for managing inbound transactions from an SAP application in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different non-transitory storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for managing inbound transactions from an SAP application in accordance with the present invention. The system 100 includes one or more SAP applications 102, each with an ALE interface 104, loosely coupled to an adapter 106 in an integration broker 108 through a computer network 110. The integration broker 108, through the adapter 106, is loosely coupled to one or more endpoints 112. The integration broker 108 also includes an event tracking repository 114. The components of the system 100 are described below.

The SAP applications 102 may be in a single EIS or may each be part of a separate EIS. The SAP applications 102 may also be part of a single SAP system or may be in separate SAP systems in the same EIS or each SAP system in a separate EIS. Typically, each SAP application 102 includes an ALE interface 104 for asynchronous communication. Transactions are communicated to the SAS applications 102 using the tRFC protocol. The SAP application 102 is a proprietary EIS from SAP AG, Walldorf, Germany. One version of SAP is SAP R/3. The SAP application 102 may comprise one or more applications running on the SAP application 102.

The integration broker 108 is a form of middleware that facilitates connection between an endpoint 112, client application, EIS, or the like and another endpoint 112, client application, or EIS. Examples of the integration broker 108 are the WebSphere® Process Server ("WPS") from IBM®, the BEA WebLogic Server®, and the SAP NetWeaver®. The integration broker 108 includes an adapter 106 for communication with an endpoint, EIS, or application. The adapter 106 along with the modules and components described herein may be included in a JCA 1.5 adapter.

An endpoint 112 may be on an integration broker 108 or may be in communication with the integration broker 108 through a computer network 110 such as the Internet. An endpoint 112 is Service Component Architecture ("SCA") compliant and may be part of an SCA component or may be a message driven bean ("MDB"). An endpoint 112 supports J2C commands. An endpoint 112 may also support XA transactions. An endpoint 112 as part of an SCA component may handle financial data, inventory, order tracking, or the like. An endpoint 112 is capable of receiving transaction data in the form of a business object ("BO") within a service data object ("SDO"). The event tracking repository 114 will be discussed further in relation to FIG. 2.

Figure 2:
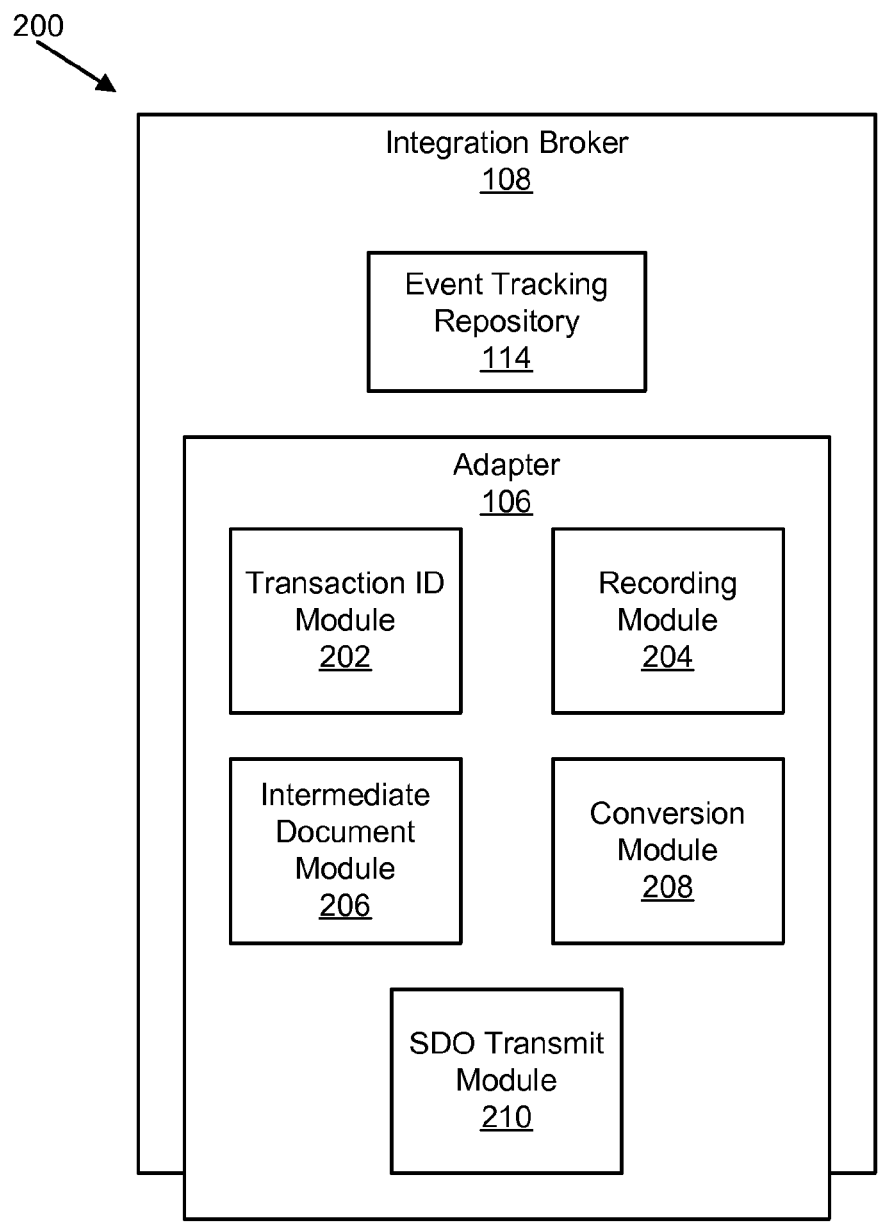
FIG. 2 is a schematic block diagram illustrating one embodiment of an apparatus for managing inbound transactions from an SAP application in accordance with the present invention.

FIG. 2 is a schematic block diagram illustrating one embodiment of an apparatus 200 for managing inbound transactions from an SAP application 102 in accordance with the present invention. The apparatus 200 includes an integration broker 108 with an adapter 106 and an event tracking repository 114 substantially similar to those described in relation to FIG. 1. The adapter 106 includes, in one embodiment, a transaction ID module 202, a recording module 204, an intermediate document module 206, a conversion module 208, and an SDO transmit module 210, which are described below.

The adapter 106 includes a transaction ID module 202 that receives a transaction identifier ("TID") associated with an event from an SAP application 102 by way of an Application Link Enabling ("ALE") interface 104 for an asynchronous transaction. An SAP application 102 tracks transaction events using a TID by generating a new TID for each new transaction event. The SAP application 102 may also maintain a status associated with each TID. For tracking transaction events that interact with an endpoint 112 or other EIS or client application, the SAP application 102 may generate a TID as requested for outbound transactions and may transmit a TID within an intermediate document ("IDoc") for tracking the transaction event.

The adapter 106 includes a recording module 204 that records an event record in the event tracking repository 114 by way of an XA transaction. The event record comprises the TID and an associated transaction status. The event tracking repository 114 may be a table, database, or other suitable structure. The event tracking repository 114 may be located on the integration broker 108 or may be in a storage device accessible from the integration broker 108. The event record may include, in addition to the TID and an associated transaction status, an XA transaction identifier ("XID"), a status of transmitting transaction data to an endpoint 112, transaction data, and the like. One of skill in the art will recognize other implementations of an event tracking repository 114 suitable for storing an event record and other information suitable for inclusion in an event record. The XA transaction will be described in below in relation to the SDO transmit module 210.

The adapter 106 includes an intermediate document module 206 that receives an intermediate document ("IDoc") containing transaction data from a transaction associated with the event and the associated TID from the SAP application 102 by way of the ALE interface 104 using the tRFC" protocol. The SAP application 102 typically sends the IDoc to the adapter 106 after sending the associated TID, as described in relation the transaction ID module 202, to allow time to determine if the transaction associated with the TID has been previously processed. Determining the status of the transaction associated with the TID will be discussed further in relation to FIGS. 3 and 6. The SAP application 102 may send the IDoc to the adapter 106 using a send batch data command. The IDoc is transmitted from the SAP application 102 asynchronously.

The adapter 106 includes a conversion module 208 that converts the IDoc to an SDO. The transaction data received from an SAP application 102 may include data or objects from one or more transactions and may be received as a data structure with multiple IDocs. If the received data structure includes multiple objects in the form of multiple IDocs, the received transaction data may be called an IDoc packet. (An IDoc packet may be referred to herein as an IDoc packet or an IDoc.) The conversion module 208 creates an SDO that is J2C compatible. An IDoc packet may be converted to an SDO with multiple BOs or may be split into multiple SDOs. Splitting an IDoc packet is discussed further in relation to FIGS. 3 and 6. The conversion module 208 may include application specific information or similar information received as part of the IDoc in the newly created SDO as metadata. The conversion module 208 may create one or more BO in the SDO that contain one or more nested or "children" BOs. One of skill in the art will recognize other ways that the conversion module 208 may create one or more SDOs with one or more BOs for transmission to an endpoint 112.

The adapter 106 includes an SDO transmit module 210 that transmits the SDO to at least one of the endpoints 112 by way of the XA transaction. An XA transaction is a transaction that spans across multiple resources. The adapter 106 acts as a transaction manager to assign an XID to a transaction and then track that the transaction is completed on the multiple resources. The adapter 106, through the recording module 204 and the SDO transmit module 210 ensures that the SDO is successfully transmitted to an endpoint 112 and that the related event record is both stored in the event tracking repository 114 and updated to reflect a status that the SDO was successfully delivered to the endpoint 112. Using an XA transaction is advantageous because a completed XA transaction assures that both the transaction contained in an SDO that was delivered to an endpoint 112 was received and processed without the endpoint 112 returning an exception and that an event record was successfully created and stored in the event tracking repository 114 together with a status of the delivery of the SDO to the endpoint 112.

The apparatus 200 provides a convenient way to manage asynchronous inbound transactions from an SAP application 102 and to asynchronously deliver the transaction to one or more an endpoints 112 for once only delivery. The apparatus 200 provides a way to manage inbound transactions that is not currently available in the present state of the art. The apparatus allows an SAP application 102 to push a TID and corresponding IDoc or IDoc packet to the adapter 106 using the tRFC protocol, to convert the IDoc or IDoc packet to one or more SDOs with one or more BOs, and to transmit the SDOs to the endpoints 112 using an XA transaction for once only delivery.

Figure 3:
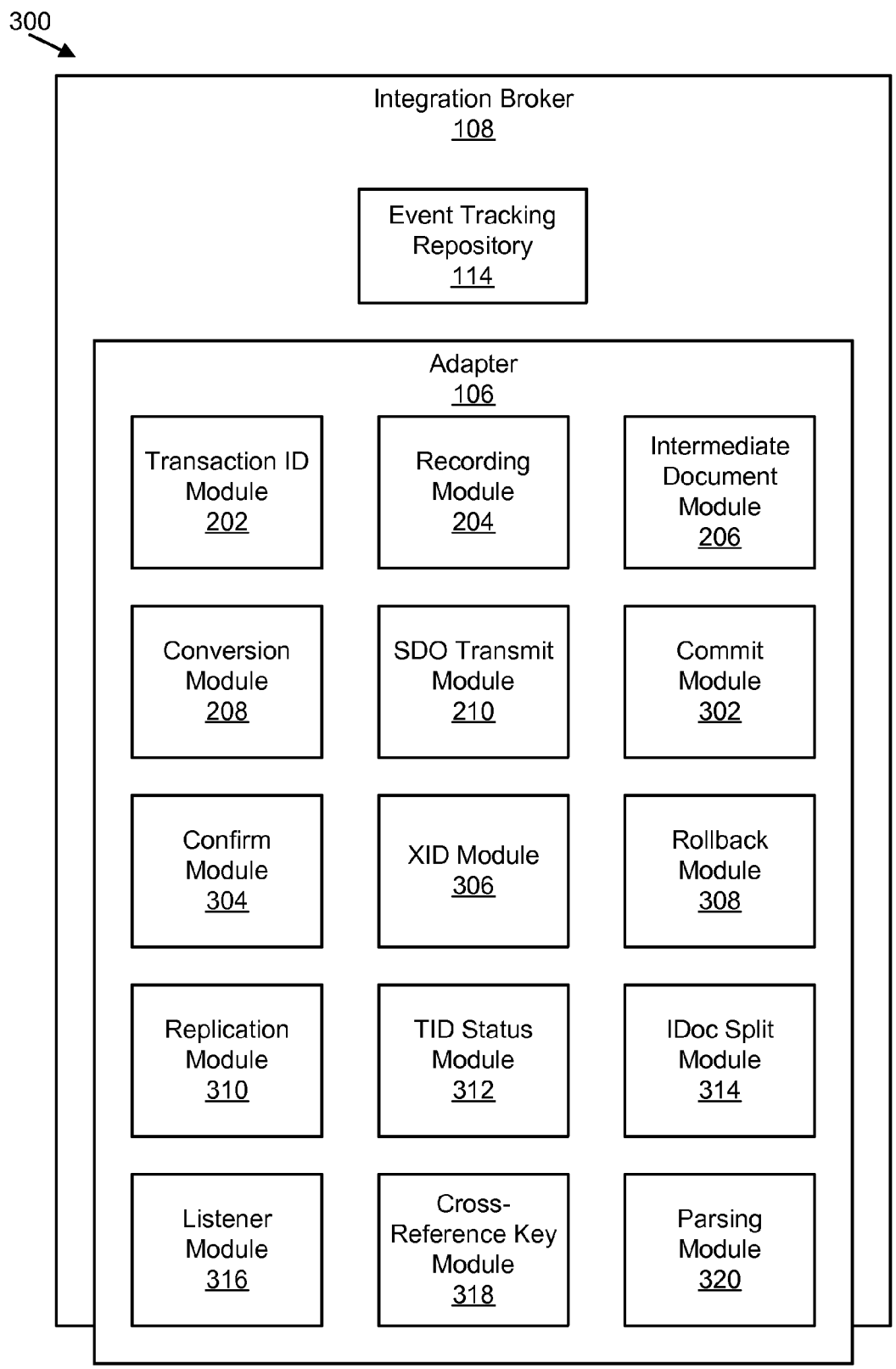
FIG. 3 is a schematic block diagram illustrating another embodiment of an apparatus for managing inbound transactions from an SAP application in accordance with the present invention.

FIG. 3 is a schematic block diagram illustrating another embodiment of an apparatus 300 for managing inbound transactions from an SAP application 102 in accordance with the present invention. The apparatus 300 includes an integration broker 108 with an adapter 106 and an event tracking repository 114 substantially similar to those described in relation to FIG. 1. The adapter 106 includes a transaction ID module 202, a recording module 204, an intermediate document module 206, a conversion module 208, and an SDO transmit module 210, substantially similar to the same modules described in relation to FIG. 2. The adapter 106 also includes, in one embodiment, a commit module 302, a confirm module 304, a, XID module 306, a rollback module 308, a replication module 310, a TID status module 312, an IDoc split module 314, a listener module 316, a cross-reference key module 318, and a parsing module 320, which are described below.

The adapter 106 includes, in one embodiment, a commit module 302 that transmits a commit call to one or more endpoints 112 by way of the XA transaction in response to receiving a commit call from the SAP application 102. The SAP application 102 transmits a commit call and the associated TID to the adapter 106 that is compliant with the tRFC protocol. The adapter 106, in turn, transmits a J2C compliant commit call and associated XID to the endpoints 112 and to the event tracking repository 114 using an XA transaction to ensure that the event record is successfully updated and that the previously transmitted one or more SDOs are committed.

The adapter 106 includes, in another embodiment, a confirm module 304 that deletes the event record associated with the TID from the event tracking repository 114 in response to receiving a confirm call from the SAP application 102. After a transaction is committed and no exceptions are returned to the SAP application 102, typically the SAP application 102 transmits a confirm call and an associated TID to the adapter 106. The adapter 106, in one embodiment, deletes the event record associated with the TID. In another embodiment, the adapter 106 marks the event record for deletion. In another embodiment, the adapter 106 archives the event record. The SAP application 102 issues the confirm call after the associated transaction has been successfully committed because the event record may no longer be needed, and deleting the event record that may be taking up valuable memory may free up memory for future event records or for another purpose. One of skill in the art will recognize other ways for an adapter 106 to delete an event record, or take similar action, in response to receiving a confirm call from an SAP application 102. The confirm module 304, in one embodiment, logs a common event infrastructure ("CEI") event that may be used for tracking the event and for audits. The common event infrastructure is a service provided in a service oriented architecture.

The adapter 106 includes, in another embodiment, an XID module 306 that ensures successful delivery of the one or more SDOs by verifying that the SDO is committed at one or more endpoints 112 by way of tracking delivery using an XID associated with each SDO. The XID module 306 creates an XID for each SDO created by the conversion module 208. The XID module 306 uses an XID related to an SDO in an XA transaction to ensure that the SDO is successfully delivered and confirmed at an endpoint 112 and that a corresponding event record is created and updated. The XID module 306 ensures successful delivery of the SDO using the XID by tracking delivery of the SDO to an endpoint 112 and tracking creation of an event record corresponding to the SDO in the event tracking repository 114. The XID module 306 may use a two-phase commit process or similar process to ensure that both the SDO was delivered to the endpoint 112 and the event record was successfully created. If there is a failure for either part of the process, then the process is rolled back. If both processes are successful, the transaction is committed. If an IDoc packet is pushed to the adapter 106 from the SAP application 102 and if the IDoc packet is split into multiple BOs to form multiple SDOs, the XID module 306 creates an XID for each SDO. Each XID is entered into the event tracking repository 114 in the event record associated with the IDoc packet and TID from the SAP application 102. One of skill in the art will recognize other ways that the XID module 306 may ensure successful delivery of one or more SDOs using XA transactions and an XID for each SDO.

In one embodiment, the adapter 106 includes a rollback module 308 that rolls back the transaction associated with the TID at each endpoint 112 that received the SDO in response to receiving a rollback call with the TID from the SAP application 102. Typically, if the SAP application 102 receives a resource exception or other similar message that the transaction associated with a TID was not successfully delivered or processed, the SAP application 102 transmits a rollback call and the associated TID to the rollback module 308 of the adapter 106. The rollback module 308 then rolls back the transaction as necessary, depending upon the state of the transaction, using a J2C rollback command in an XA transaction. The rollback module 308 also rolls back the associated event record in the event tracking repository 114. In one embodiment, rolling back the event record comprises deleting the event record. In another embodiment, rolling back the event record comprises updating a status in the event record. One of skill in the art will recognize other ways for the rollback module 308 to rollback a transaction in response to receiving a rollback call related to the transaction from the SAP application 102.

In another embodiment, the adapter 106 includes a replication module 310 that replicates the SDO and the SDO transmit module 210 transmits the SDO to a plurality of endpoints 112. The plurality of endpoints 112, in this embodiment, has identical subscription information. In one embodiment, subscription information is included in an ActivationSpec. Where the subscription information is identical in two or more endpoints 112, any IDoc or IDoc packet intended for one endpoint 112 will also be intended for the other endpoints 112 with identical subscription information. The replication module 310 clones an SDO intended for the endpoints 112 with identical subscription information. The cloned SDOs may then be transmitted to the endpoints 112 with identical subscription information by the SDO transmit module 210. In one embodiment, an IDoc is converted to a single SDO with a single BO and then cloned by the replication module 310. In another embodiment, an IDoc packet is split to create multiple BOs and related SDOs and one or more SDO is cloned by the replication module 310 before the SDO transmit module 210 transmits the cloned SDOs to endpoints 112 with identical subscription information. In yet another embodiment, an IDoc packet is converted to an SDO with multiple BOs and the SDO is cloned by the replication module 310 before the SDO transmit module 210 transmits the cloned SDOs to endpoints 112. One of skill in the art will recognize other ways for the replication module 310 to replicate an SDO for subsequent transmission to endpoints 112 with identical subscription information.

The adapter 106, in another embodiment, includes a TID status module 312 that returns an executed status to the SAP application 102 in response to receiving a TID matching a TID in the event tracking repository 114 having an associated transaction status indicating completion of the transaction. After receiving a TID from the SAP application 102, the TID status module 312 checks the status of the TID by reviewing the associated event record in the event tracking repository 114. If the status indicates that the transaction associated with the TID has been executed, the TID status module 312 transmits an executed status to the SAP application 102. An executed status is any status that indicates that the transaction associated with the TID has been successfully executed. In one embodiment, the status is a Boolean variable and the TID status module 312 returns a variable called onCheckTID. If the TID status module 312 determines that the transaction associated with the received TID has been executed, the TID status module 312 returns the onCheckTID variable with a value of "false." The SAP application 102 may associate the "false" value of the onCheckTID variable with the adapter having executed the associated transaction. Typically the SAP application 102 will end processing of the transaction. The SAP application 102 may then update the status of the transaction in the SAP application 102 to reflect that the transaction is executed.

The TID status module 312 may also return a created status to the SAP application 102 in response to any of receiving a TID matching a TID in the event tracking repository 114, having an associated transaction status of a rollback status, and receiving a TID not matching a TID in the event tracking repository. A created status comprises any status indicator that indicates to the SAP application 102 to proceed with the transaction by pushing an IDoc and subsequent commit call to the adapter 106.

Typically, if the event tracking repository 114 does not include an event record with a TID that matches a TID received from the SAP application 102, the transaction associated with the TID has not been previously received by the adapter 106. In this case, the TID status module 312 returns a created status to the SAP application 102 signaling the SAP application 102 to proceed with the transaction. In another embodiment, the adapter 106 receives a TID and the TID status module 312 determines that the TID matches a TID in an event record and the event record has a status of rollback. In this embodiment, the TID status module 312 returns a created status so the SAP application 102 may proceed with retrying the transaction. The SAP application 102 may also send a confirm call to the confirm module 304 so the event record associated with the transaction is deleted rather than retried. This may occur if the SAP application 102 has reached a retry limit associated with the TID or if the SAP application 102 is set to not retry the transaction associated with the TID. In one embodiment, if the TID status module 312 determines that the transaction associated with the received TID has not been executed or has a rollback status, the TID status module 312 returns the onCheckTID variable with a value of "true" and the SAP application 102 continues with processing the transaction.

In one embodiment, a status field in the event record of the transaction in the event tracking repository 114 may indicate a status of CREATED, EXECUTED, INPROGRESS, or ROLLBACK. The recording module 204 may create an event record of a transaction with a status of CREATED when a TID is received by the transaction ID module 202 and the TID status module 312 determines that the event tracking repository 114 does not contain an event record with a matching TID. An event record typically is updated to have a status of EXECUTED after the commit module 302 commits all transaction operations associated with a received IDoc or IDoc packet. An event record may be updated to have a status of INPROGRESS if one or more SDOs associated with a TID are transmitted to one or more endpoints 112 and some SDOs have not been transmitted. The event record may also include a field that includes the number of BOs resulting from a split IDoc packet. Another field may be updated to indicate the number of BOs processed.

In one embodiment, if an error occurs while transmitting an SDO to an endpoint 112, during processing of the SDO, or creating or updating a related event record, the event record may be updated by the rollback module 308 to indicate a status of ROLLBACK or a similar status. The rollback module 308 rolls back the transaction at the endpoint 112 by rolling back any operation associated with delivery of the SDO to the endpoint 112. In one embodiment, if an error occurs in creating an event record, a resource exception may be returned to the SAP application 102. In another embodiment, if an error occurs while updating an event record, the event record may be rolled back to a previous state. In one embodiment, the TID status module 312 returns an EXECUTED status to the SAP application 102 if the status of the transaction in the associated event record is that of EXECUTED. One of skill in the art will recognize other integer strings, variables, etc. that may be used in a status of an event record as well as other states of a transaction that may be used to indicate status of a transaction and may be returned to the SAP application 102 by the TID status module 312.

The adapter 106, in yet another embodiment, includes an IDoc split module 314 that splits an IDoc packet into a plurality of IDocs in response to an IDoc split indicator. The conversion module 208 may then convert each resulting IDoc into an SDO, and the SDO transmit module 210 may transmit each resulting SDO to one endpoint 112. In an alternate embodiment, the SDO transmit module 210 transmits each resulting SDO to one or more endpoints 112 based on subscription information of the endpoints 112. In another embodiment, the conversion module 208 converts an IDoc packet into an SDO and the IDoc split module 314 splits the resulting SDO into multiple BOs that are formed into SDOs in response to an IDoc split indicator. In one embodiment, the IDoc split indicator is set during initialization of the adapter 106. The IDoc split indicator, in another embodiment, is a variable, field, text string, etc. in the IDoc or other data structure transmitted from the SAP application 102.

The IDoc split indicator may be metadata and may be a variable called SplitIDocPacket. If the value of the SplitIDocPacket is returned as "true," the IDoc split module 314 splits the IDoc packet and the resulting BOs are converted to SDOs. The SDO transmit module 210 then transmits each resulting SDO to an appropriate endpoint 112. If the value of the SplitIDocPacket is returned as "false," the IDoc split module 314 does not split the IDoc packet and the conversion module 208 converts the IDoc to an SDO with multiple BOs. The SDO transmit module 210 transmits the SDO to an endpoint 112. The replication module 310 may also replicate the SDO and transmit the resulting SDOs, each with multiple BOs, to the appropriate endpoints 112. One of skill in the art will recognize other ways that an IDoc split module 314 may split an IDoc packet in response to an IDoc split indicator.

In one embodiment, the adapter 106 includes a listener module 316 that creates an event listener associated with an endpoint 112 in response to the endpoint registering with the adapter 106. The event listener may be configured to listen for events pushed from the SAP application 102 and intended for delivery to the endpoint 112. The listener module 316 may create an event listener in the adapter 106 for each endpoint 112 with different subscription information. An event listener may be created when an endpoint 112 registers with the adapter 106 seeking to receive transactions from an SAP application 102. In one embodiment, separate event listeners are created for each registered endpoint 112. In another embodiment, an event listener is created for two or more endpoints 112 with identical subscription information. In yet another embodiment, one or more event listeners are created when the adapter 106 is initialized.

The apparatus 300 supports multiple SAP applications 102. One SAP application 102 may communicate with one set of event listeners and another SAP application may communicate with another set of event listeners. An event listener may sense a TID or related IDoc pushed from an SAP application 102. An adapter 106 with event listeners supports asynchronous communication with an SAP application 102. One of skill in the art will recognize other ways that the listener module 316 may create event listeners to establish communication between an SAP application 102 and an endpoint 112.

The adapter 106 may also include a cross-reference key module 318 that creates a cross-reference identifier in metadata of an SDO. The cross-reference identifier comprises a mapping to a key identifier in metadata of the IDoc to a key identifier. The key identifier comprises information used by the endpoint 112 in completing the transaction. The key identifier may be, for example, an order number, an account number, a routing number, or the like. The key identifier may be located somewhere within the IDoc and not easily accessible by an endpoint 112. The cross-reference key may provide a mapping to one or more key identifiers in an IDoc and resulting SDO so that an endpoint 112 may easily access key information. In one embodiment, the cross-reference key module 318 creates a different cross-reference key for each key identifier. In another embodiment, the cross-reference key module 318 creates one cross-reference key that encompasses a mapping for each key identifier. In one embodiment, the cross-reference key module 318 creates a cross-reference key in metadata of an SDO. In another embodiment, the cross-reference key module 318 creates a cross-reference key in a field or attribute of the SDO other than in the metadata of the SDO. One of skill in the art will recognize other implementations of a cross-reference key module 318 that creates one or more cross-reference keys in an SDO by mapping a key identifier in a received IDoc.

In yet another embodiment, the adapter 106 includes a parsing module 320 that parses the IDoc in response to a parsing indicator. Typically an IDoc is pushed by an SAP application 102 to an adapter 106 in an unparsed format. The parsing module 320 parses the IDoc as directed by a parsing indicator. The resulting SDO then includes the information of the IDoc in a parsed format. The parsing indicator, in one embodiment, may be defined in a repository of XMLs or XSDs that define a particular SDO for the transaction.

Typically, an SDO includes a metadata property "type" the defines the parsing indicator. The parsing indicator may have a value of "UNPARSEDIDOC" indicating that the IDoc is to remain unparsed. The parsing indicator may be set to "IDOC" to indicate that the IDoc is to be parsed. Of course other variables/values may be used to indicate whether the IDoc is to be parsed in generating the SDO or not. For a fixed-width format, the parsing module 320 may set the segment size data in the IDocData field of the SDO's BO structure as a byte array of fixed data length. In cases where data in the unparsed IDoc does not span an entire segment size, an end of segment may be denoted by a 'null' character. For a delimited format, the parsing module 320 may add a delimiting character to the end of the data.

The parsing module 320 may parse the IDoc into various formats. The parsed data may be stored in the SDO within one or more IDocData fields or other SDO attributes. For example, the parsing module 320 may parse data of an IDoc into variable length SDO fields, SDO fields that include delimiters such a tabs, commas, or other delimters between data value, SDO fields having a fixed-width format, SDO fields a base 64 encoding format, SDO fields having a mixed format comprising both delimited and fixed-width formats, and the like. Typically, the parsing indicator is defined to have a certain value when the SDO is defined in an XML or XSD repository. In another embodiment, a plurality of parsing formats are available and the parsing module 320 parses the IDoc or not based on subscription information of an intended endpoint (for example, the activationspec may provide the parsing indicator).

The parsing module 320 may provide support in the adapter 106 for unparsed IDocs using a wrapper business object in the SDO, which may contain an array of unparsed IDoc objects. An unparsed IDoc object within the SDO may include a control record object and an IDocData field. The control record object may contain metadata about the IDoc to be processed. The IDocData field may be an array of data bytes and may contain the actual IDoc segment data in a fixed-width format where individual segments of data are delimited by a 'null' within the array. As described above, other formats may be used. The parsing module 320 processes an unparsed IDoc by using the information in the control record. The parsing module 320 may also support IDoc packets and may parse an IDoc packet into multiple SDOs or a single SDO if the IDoc packet is not split. One of skill in the art will know other ways in which the parsing module 320 may process an unparsed IDoc or IDoc packet.

The apparatus 300 provides a convenient way to manage inbound transactions from an SAP application 102. The apparatus 300, in addition to the features of the apparatus 200 described in relation to FIG. 2, has the ability to commit transactions, confirm transactions, track events in a J2C environment using XA transactions and an XID for each transaction, and rollback transactions. The apparatus 300 also includes the ability to replicate transactions for transmission to endpoints 112 with identical subscription information, signal the SAP application 102 to end a transaction if a TID has been previously executed, split IDoc packets, spawn listener threads, provide a cross-reference key, and parse IDocs. The described features have not been developed in the prior art.

Figure 4:
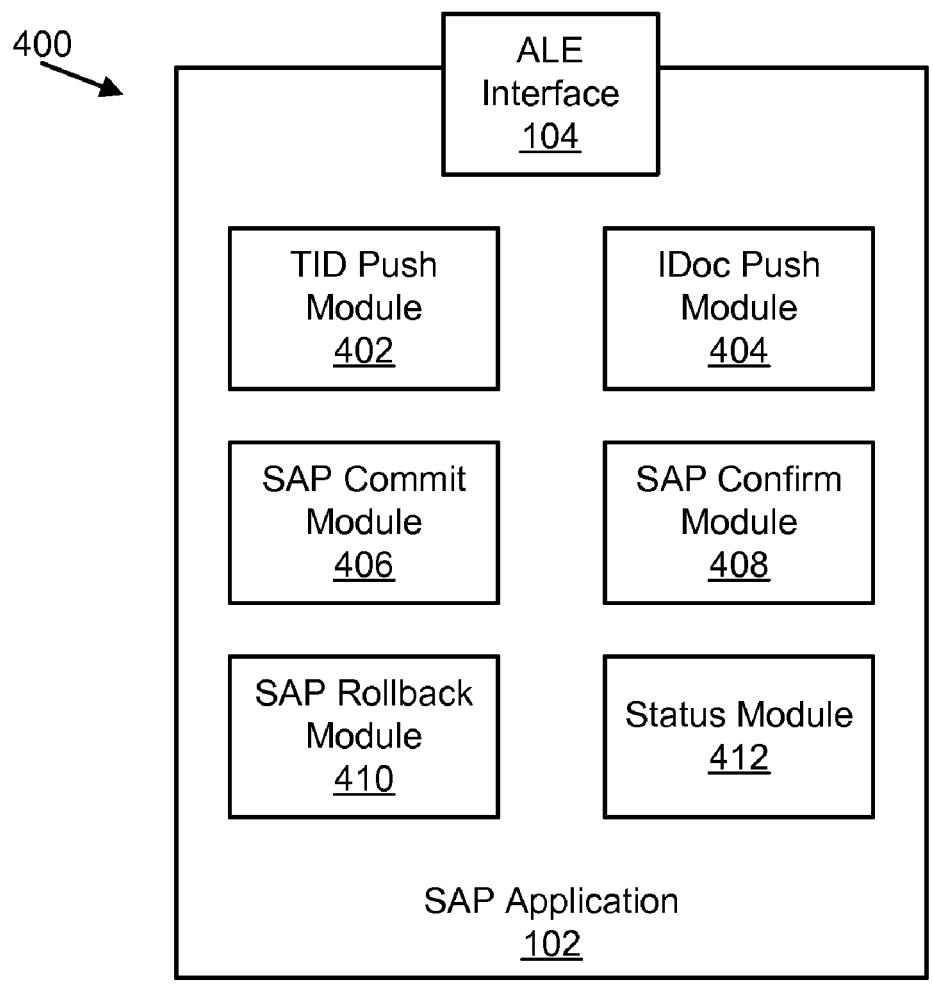
FIG. 4 is a schematic block diagram illustrating an alternate embodiment of an apparatus for managing inbound transactions from an SAP application in accordance with the present invention.

FIG. 4 is a schematic block diagram illustrating an alternate embodiment of an apparatus 400 for managing inbound transactions from an SAP application 102 in accordance with the present invention. The apparatus 400 includes an SAP application 102 with an ALE Interface 104 substantially similar to those described in relation to FIG. 1. The SAP application 102 includes a TID push module 402, an IDoc push module 404, an SAP commit module 406, an SAP confirm module 408, an SAP rollback module 410, and a status module 412, which are described below.

The SAP application 102 includes a TID push module 402 that pushes a TID associated with an event through the ALE interface 104 to the adapter 106 with a listener thread. The listener thread is configured to listen for events from the SAP application 102 to be transmitted to an endpoint 112 registered with the adapter 106. Typically the adapter 106 includes a listener thread for each endpoint 112 registering with the adapter 106. The adapter 106 records an event record in the event tracking repository 114 by way of an XA transaction. The event record comprises the TID and an associated transaction status. The TID push module 402 pushes a TID to the adapter 106 asynchronously.

The SAP application 102 includes an IDoc push module 404 that pushes an IDoc containing transaction data from a transaction associated with the event and the associated TID to the adapter 106 by way of the ALE interface 104 using the tRFC protocol. The IDoc may include one IDoc or an IDoc packet with two or more IDocs. The adapter 106 is configured to convert the IDoc or IDoc packet to one or more SDOs and to transmit the SDOs to the one or more endpoints 112 by way of the XA transactions in response to receiving the IDoc or IDoc packet from the SAP application 102. The IDoc push module 404 pushes an IDoc or IDoc packet to the adapter 106 asynchronously. The adapter 106 may transmit an acknowledgement of receipt of the IDoc synchronously.

The SAP application 102 includes an SAP commit module 406 that transmits a commit call with the associated TID to the adapter 106. The adapter 106 is configured to transmit the commit call to the one or more endpoints 112 using an XA transaction in response to receiving the commit call from the SAP application 102. Typically the SAP commit module 406 asynchronously transmits a commit call and TID to the adapter 106 after the IDoc push module 406 successfully pushes an IDoc or IDoc packet to the adapter 106.

The SAP application 102 includes an SAP confirm module 408 that transmits a confirm call with the associated TID to the adapter 106. The adapter 106 is configured to delete the event record associated with the TID from the event tracking repository 114 in response to receiving the confirm call from the SAP application 102. Typically the SAP confirm module 408 asynchronously transmits the confirm call and TID sometime after the SAP commit module 406 transmits a commit call and the SAP application 102 has not received a resource exception or similar message from the adapter 106 that the previously sent IDoc was not processed. If the SAP application receives a resource exception or similar message, the SAP confirm module 404 will not send a confirm call.

The SAP application 102 includes an SAP rollback module 410 that transmits a rollback call and associated TID to the adapter 106. The adapter 106 is configured to rollback the transaction associated with the TID in response to receiving the rollback call from the SAP application. The SAP rollback module 410 typically asynchronously transmits the rollback call to the adapter 106 after receiving a resource exception or similar message from the adapter 106 indicating that the transaction processing in the adapter 106 or endpoint 112 encountered an error of some type.

The SAP application 102 includes a status module 412 that updates the status of an event in the SAP application 102 in response to receiving a status update call from the adapter 106. The adapter 106, in one embodiment, includes an ability to report a status of the IDoc processing to the SAP application 102. If the status update function of the adapter 106 is activated, the adapter 106 transmits a status update to the SAP application 102 as the associated transaction proceeds. In one embodiment, if an IDoc packet is split, the status module 412 updates the status of each transmitted SDO. For example, the adapter 106 may post a status update IDoc to the SAP application 102 through the SAP interface 104. A status update IDoc is an IDoc for updating the status of a transaction. In one embodiment, the status update IDoc is called an ALEAUD IDoc. Examples of adapter 106 properties for the status update IDoc may include ALESuccessCode, ALEFailureCode, ALESuccessText, and ALEFailureText.

The adapter 106 may transmit the status update IDoc with an appropriate status to the status module 412 after sending the IDoc from the IDoc push module 404 to an endpoint 112. The status module 412 may use SAP standard IDoc status codes as values for adapter properties. For example, the adapter property "ALESuccessCode" may have a value of "12" signifying successful processing of an IDoc. The adapter property "ALEFailureCode" may have a value of "11" signifying a failure in processing of an IDoc. The adapter properties "ALESuccessText" and "ALEFailureText" may include appropriate text messages. The status module 412 updates a status in the SAP application 102 of the event that generated the IDoc sent to the adapter 106. Typically, the status update IDoc would include the associated TID and the status module 412 updates the status of the transaction associated with the TID. One of skill in the art will recognize other ways that an adapter 106 may transmit a status of a transaction to an SAP application 102 and that the SAP application 102 may track and update a status of the transaction.

Figure 5:
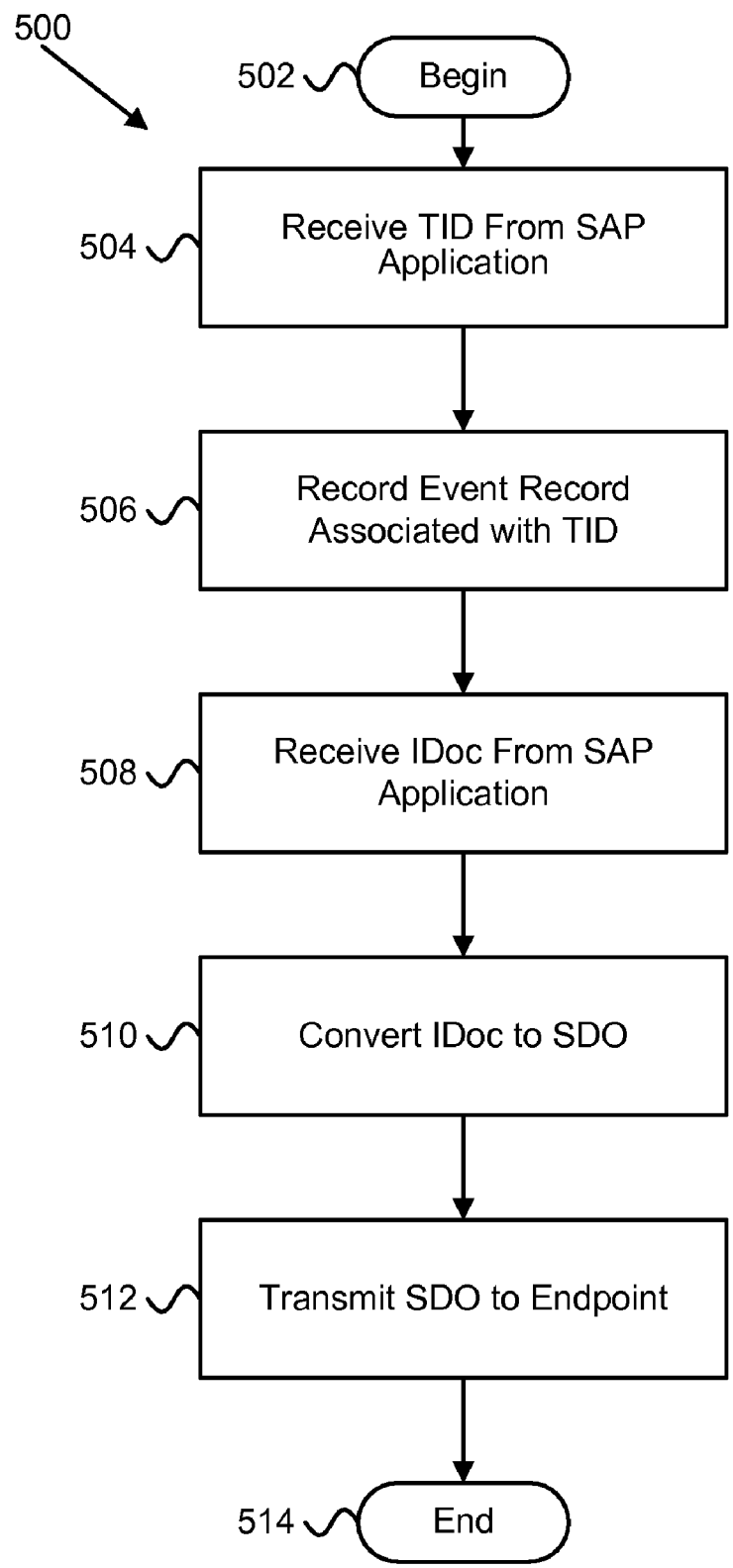
FIG. 5 is a schematic flow chart diagram illustrating one embodiment of a method for managing inbound transactions from an SAP application in accordance with the present invention.

FIG. 5 is a schematic flow chart diagram illustrating one embodiment of a method 500 for managing inbound transactions from an SAP application 102 in accordance with the present invention. The method 500 begins 502 and the transaction ID module 202 receives 504 a TID associated with an event from the SAP application 102 through the ALE interface 104. The TID is for an asynchronous transaction associated with the event. The recording module 204 records 506 an event record in the event tracking repository 114 by way of an XA transaction. The event record comprises the TID and a status of the transaction associated with the TID. The recording module 204 may include a status of CREATED if the TID does not match a TID in an event record. The intermediate document module 206 asynchronously receives 508 an IDoc from the SAP application 102. The conversion module 208 converts 510 the IDoc to an SDO. The SDO includes one or more BOs and each BO includes transaction data from a transaction related to the event. The SDO transmit module 210 then transmits 512 the SDO to an endpoint 112 and the method 500 ends 514. The SDO transmit module 210 transmits the SDO to the endpoint 112 by way of the XA transaction. Using an XA transaction to deliver the event record to the event tracking repository 114 and to deliver the related SDO to the endpoint 112 allows once only delivery of the transaction data from a transaction associated with an event.

Figure 6A:
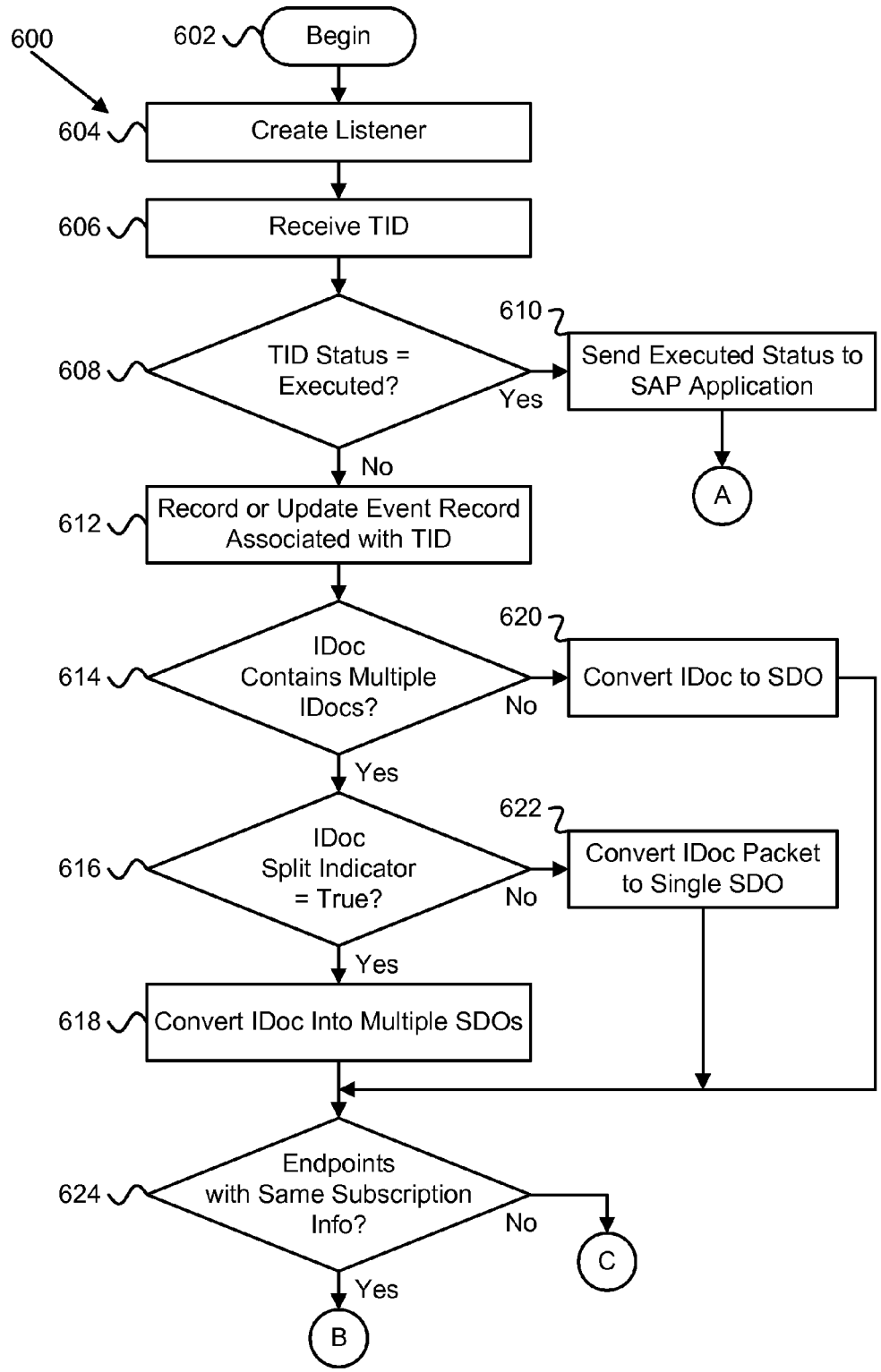
FIG. 6A is a schematic flow chart diagram illustrating one part of another embodiment of a method for managing inbound transactions from an SAP application in accordance with the present invention.
Figure 6B:
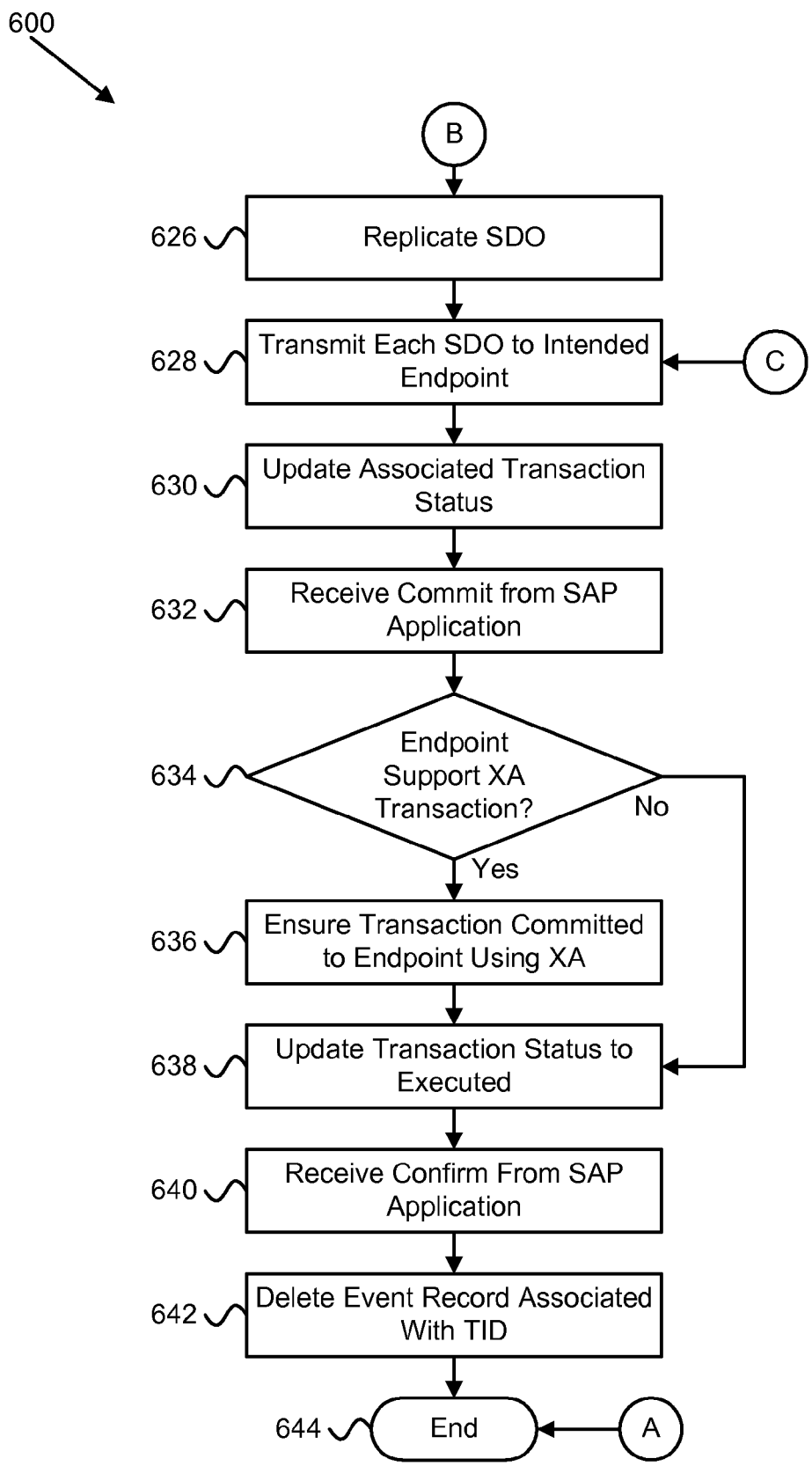
FIG. 6B is a schematic flow chart diagram illustrating another part of another embodiment of a method for managing inbound transactions from an SAP application in accordance with the present invention.

FIGS. 6A and 6B are two parts of a schematic flow chart diagram illustrating another embodiment of a method 600 for managing inbound transactions from an SAP application in accordance with the present invention. The method 600 begins 602 and the listener module 316 creates 604 an event listener associated with an endpoint 112 for each endpoint 112 registering with the adapter 106. The transaction ID module 202 receives 606 a TID associated with an event from the SAP application 102 through the ALE interface 104. The TID status module 312 determines 608 if the event tracking repository 114 includes an event record with a TID that matches the received TID and if so, determines if the status of the TID in the event record indicates that the transaction has been executed. If the TID status module 312 determines 608 that an event record has a matching TID and the status indicates that the corresponding transaction has been executed, the TID status module 312 sends 610 an executed status to the SAP application 102 and the method 600 ends 644 (follow A on FIG. 6A to A on FIG. 6B).

If the TID status module 312 determines 608 there is no event record with a matching TID in the event tracking repository 114 or that an event record with a matching TID has a rollback status, the recording module 204 records 612 or updates an event record in the event tracking repository 114 by way of an XA transaction. The status, in one embodiment, may be updated to that of CREATED. The event record comprises the TID and a status of the transaction. The XID module 306 generates an XID to track the XA transaction and the XID may be stored in the event record. The event record may also include other information.

The IDoc split module 314 determines 614 if the received IDoc is an IDoc packet containing multiple IDocs. If the IDoc split module 314 determines 614 that the received IDoc does contain multiple IDocs (i.e., the IDoc is an IDoc packet), the IDoc split module 314 determines 616 if the IDoc split indicator is set to require that the IDoc be split. If the IDoc split module 314 determines 616 that the IDoc split indicator is set to require that an IDoc packet be split, the IDoc split module 314 converts 618 the IDoc packet into multiple SDOs. Each SDO from a split IDoc packet typically includes one BO. In another embodiment, the SDO may contain one or more BO and each BO may contain children BOs, depending on the structure of the IDoc.

If the IDoc split module 314 determines 614 that the received IDoc does not contain multiple IDocs, the conversion module 208 converts 620 the IDoc to an SDO. If the IDoc split module 314 determines 616 that the IDoc contains multiple IDocs and determines 616 that the IDoc split indicator is set to not require that the IDoc be split, the conversion module 208 converts 622 the IDoc packet to a single SDO with multiple BOs.

The replication module 310 determines 624 if there are endpoints 112 with identical subscription information. If the replication module 310 determines 624 that there are endpoints 112 with identical subscription information, the replication module 310 replicates 626 the SDO intended for each endpoint 112 with identical subscription information (follow B on FIG. 6A to B on FIG. 6B). The SDO transmit module 210 transmits 628 the one or more SDOs to the respective intended endpoints 112. If the replication module 310 determines 624 that there are not endpoints 112 with identical subscription information, SDO transmit module 210 transmits 628 the one or more SDOs to the respective intended endpoints 112 (follow C on FIG. 6A to C on FIG. 6B). Also, if more than one endpoint 112 receives an SDO, the XID module 306 generates an XID for each XA transaction to track delivery and processing of an SDO to each endpoint 112 and to update the event record for each related to each delivery. The XIDs may be stored in the event record associated with the TID related to the transaction. In another embodiment, an event record is created for each XA transaction where an SDO is delivered to an endpoint 112. One of skill in the art will recognize other ways for the XID module 306 to generate and store an XID for each SDO delivered to an endpoint 112.

The SDO transmit module 210 updates 630 the transaction status in of the event record in the event tracking repository 114 associated with the transmitted SDO. In one embodiment, the status is updated to INPROGRESS. The adapter 106, in another embodiment, updates a tracking variable in the appropriate event record as each SDO is sent to an endpoint 112. In another embodiment, the SDO transmit module 210 updates 628 the transaction status only after all SDO are transmitted to endpoints 112.

The commit module 302 receives 632 a commit call from the SAP application 102. The commit module 302 determines 634 if the endpoint 112 receiving an SDO and commit call supports XA transactions. If the commit module 302 determines 634 that the endpoint 112 receiving an SDO supports XA transactions, the commit module 302 ensures 636 that the transaction is committed to the endpoint 112 and simultaneously ensures that the related event record is created and updated to the proper status by way of the XA transaction. The XA transaction may use a two-phase commit protocol. If any problems are encountered in the XA transaction, the rollback module 308 may signal a rollback. If the transaction in the SDO is successfully delivered and committed to the endpoint 112, the commit module 302 updates 638 the status of the event record to reflect that the transaction is executed.

If the commit module 302 determines 634 that the endpoint 112 receiving an SDO does not support XA transactions, the commit module 302 updates 638 the status of the event record to reflect that the transaction is executed after the SDO transmit module 210 has delivered the SDO to the endpoint. The commit module 302, in one embodiment, updates the event record associated with the TID to EXECUTED. If the adapter 106 is configured to update the SAP application on the status of the transaction, the adapter 106 transmits an ALEAUD IDoc to the SAP application 102 with information to update the status of the transaction.

The confirm module 304 receives 640 a confirm call and associated TID from the SAP application 102. The confirm module 304 then deletes 642 the event record associated with the transaction from the event tracking repository 114 and the method 600 ends 642. The confirm module 304 may also archive the event record, mark the event record for deletion, or the like. The method 600 may also be repeated for transactions from another SAP application 102 where the adapter 106 has been configured to support more than one SAP application 102. The confirm module 304 may also log a CEI event.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable storage medium having computer usable program code programmed for managing inbound transactions from an application, the operations of the computer program product comprising:
   receiving a transaction identifier ("TID") associated with an event from an application for an asynchronous transaction;
   recording an event record in an event tracking repository by way of an extended architecture ("XA") transaction, the event record comprising the TID and an associated transaction status;
   receiving an intermediate document ("IDoc") containing transaction data for a transaction associated with the event and the associated TID from the application using a Transaction Remote Function Call ("tRFC") protocol;
   converting the IDoc to a service data object ("SDO"), wherein the SDO is Java Platform 2 Enterprise Edition ("J2EE") Connector Architecture ("J2C") compatible;
   transmitting the SDO to an endpoint by way of the XA transaction; and
   updating an associated transaction status to indicate execution of the transaction associated with the TID in response to receiving a commit call from the application and successfully delivering the SDO to the endpoint.

2. The computer program product of claim 1, transmitting a commit call to the endpoint by way of the XA transaction in response to receiving a commit call from the application.

3. The computer program product of claim 1, further comprising deleting the event record associated with the TID from the event tracking repository in response to receiving a confirm call from the application.

4. The computer program product of claim 1, wherein successful delivery of the SDO further comprises verifying that the SDO is committed at the endpoint by way of tracking delivery using an extended architecture identifier ("XID") associated with the SDO.

5. The computer program product of claim 1, further comprising rolling back the transaction associated with the TID at each endpoint that received the SDO and updating the event record associated with the TID to a rollback status in response to an error in managing the SDO at an endpoint.

6. The computer program product of claim 1, further comprising replicating the SDO and transmitting the SDO to a plurality of endpoints, wherein the plurality of endpoints has identical subscription information.

7. The computer program product of claim 1, further comprising returning an executed status to the application in response to receiving a TID matching a TID in the event tracking repository having an associated transaction status indicating completion of the transaction and returning a created status to the application in response to any of receiving a TID matching a TID in the event tracking repository, having an associated transaction status of a rollback status, and receiving a TID not matching a TID in the event tracking repository.

8. The computer program product of claim 1, wherein the IDoc comprises an IDoc packet with multiple IDocs and further comprising splitting the IDoc packet into a plurality of IDocs in response to an IDoc split indicator, converting each resulting IDoc into an SDO, and transmitting each resulting SDO to one or more endpoints based on subscription information of the endpoints.

9. The computer program product of claim 1, wherein the IDoc is an IDoc packet comprising multiple IDocs and further comprising converting the IDoc packet to an SDO and transmitting the SDO to the endpoint.

10. The computer program product of claim 1, further comprising associating an XID with the SDO for once only delivery of the SDO to the endpoint.

11. The computer program product of claim 1, further comprising creating an event listener associated with an endpoint in response to the endpoint registering with the adapter, wherein the event listener is configured to listen for events pushed from the SAP application and intended for delivery to the endpoint.

12. The computer program product of claim 1, further comprising a cross-reference identifier in metadata of the IDoc, wherein the cross-reference identifier comprises a mapping to a key identifier located in the IDoc and the key identifier comprises information used by the endpoint in completing the transaction.

13. The computer program product of claim 1, further comprising receiving TIDs and IDocs from more than one application wherein each application supports transactions with a unique set of one or more endpoints.

14. The computer program product of claim 1, further comprising parsing the SDO in response to a parsing indicator.

15. An apparatus for managing inbound transactions from an application, the apparatus comprising:
   a storage device storing executable code;
   a processor executing the executable code, the executable code comprising:
      a TID push module pushing a transaction identifier ("TID") associated with an event through an Application Link Enabling ("ALE") interface to an adapter with a listener thread, the listener thread configured to listen for events from the application to be transmitted to an endpoint registered with the adapter, the adapter recording an event record in an event tracking repository by way of an extended architecture ("XA") transaction, the event record comprising the TID and an associated transaction status;

an IDoc push module pushing an intermediate document ("IDoc") containing transaction data from a transaction associated with the event and the associated TID to the adapter by way of the ALE interface using a Transaction Remote Function Call ("tRFC") protocol, the adapter converting the IDoc to a service data object ("SDO"), wherein the SDO is Java Platform 2 Enterprise Edition ("J2EE") Connector Architecture ("J2C") compatible, and transmitting the SDO to the endpoint by way of the XA transaction in response to receiving the IDoc from the application;

a commit module transmitting a commit call with the associated TID to the adapter, the adapter transmitting the commit call to the endpoint using an XA transaction in response to receiving the commit call from the application;

an SDO transmit module updating an associated transaction status to indicate execution of the transaction associated with the TID in response to receiving the commit call and successfully delivering the SDO to the endpoint; and a confirm module transmitting a confirm call with the associated TID to the adapter, the adapter deleting the event record associated with the TID from the event tracking repository in response to receiving the confirm call from the application.

16. The apparatus of claim 15, further comprising a rollback module transmitting a rollback call and associated TID to the adapter, wherein the adapter rolling back the transaction associated with the TID in response to receiving the rollback call from the application.

17. The apparatus of claim 15, further comprising a status module updating a status of an event in the application in response to receiving a status update call from the adapter.

18. A system for managing inbound transactions from an application in a service oriented architecture ("SOA"), the system comprising:

a storage device storing executable code;

a processor executing the executable code, the executable code comprising:

an application with an interface;

two or more endpoints; and an adapter on an integration broker in communication with the endpoint, the adapter loosely coupled to the interface of the application and the endpoints, the adapter comprising a transaction ID module receiving a transaction identifier ("TID") associated with an event from an SAP application by way of the SAP interface for an asynchronous transaction; a recording module recording an event record in an event tracking repository by way of an extended architecture ("XA") transaction, the event record comprising the TID and an associated transaction status; an intermediate document module receiving an intermediate document ("IDoc") containing transaction data from a transaction associated with the event and the associated TID from the SAP application by way of the SAP interface using a Transaction Remote Function Call ("tRFC") protocol; a conversion module converting the Doc to a service data object ("SDO"), wherein the SDO is Java Platform 2 Enterprise Edition ("J2EE") Connector Architecture ("J2C") compatible; an SDO transmit module transmit the SDO to at least one of the endpoints by way of the XA transaction and updating an associated transaction status to indicate execution of the transaction associated with the TID in response to receiving a commit call from the application and successfully delivering the SDO to the endpoint.

19. The system of claim 18, wherein the endpoints comprise Service Component Architecture ("SCA") components.

20. The system of claim 18, further comprising a commit module transmitting a commit call associated with the TID to the endpoints receiving the SDO by way of an XA transaction in response to receiving a commit call with an associated TID from the SAP application.

21. The system of claim 18, further comprising a confirm module deleting the event record associated with the TID from the event tracking repository in response to receiving a confirm call from the SAP application with the associated TID.

22. A method for deploying an adapter for managing inbound transactions from an application, the method comprising:

determining, by use of a processor, customer integration broker connection requirements;

executing an adapter for managing inbound transactions from an application, the adapter configured to receive a transaction identifier ("TID") associated with an event from the application by way of an Application Link Enabling ("ALE") interface for an asynchronous transaction;

record an event record in an event tracking repository by way of an extended architecture ("XA") transaction, the event record comprising the TID and an associated transaction status;

receive an intermediate document ("IDoc") containing transaction data from a transaction associated with the event and the associated TID from the application by way of the ALE interface using a Transaction Remote Function Call ("tRFC") protocol;

convert the IDoc to a service data object ("SDO"), wherein the SDO is Java Platform 2 Enterprise Edition ("J2EE") Connector Architecture ("J2C") compatible; and transmit the SDO to an endpoint by way of the XA transaction; and updating an associated transaction status to indicate execution of the transaction associated with the TID in response to receiving a commit call from the application and successfully delivering the SDO to the endpoint.

* * * * *